United States Patent
Inoue et al.

(10) Patent No.: US 6,212,150 B1
(45) Date of Patent: Apr. 3, 2001

(54) OPTICAL PICKUP APPARATUS AND OPTICAL RECORDING MEDIUM DRIVE EMPLOYING THE SAME INCLUDING A FIRST PHOTO RECEIVING ELEMENT FOR DETECTING THE STATE OF LIGHT BEAM AND A SECOND PHOTO RECEIVING ELEMENT FOR REPRODUCING INFORMATION

(75) Inventors: Yasuaki Inoue, Nagaokakyo; Takenori Goto, Moriguchi; Atsushi Tajiri, Mishima-gun; Kazushi Mori, Hirakata; Minoru Sawada, Yawata; Akira Ibaraki, Hirakata, all of (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/027,717

(22) Filed: Feb. 23, 1998

(30) Foreign Application Priority Data

Feb. 24, 1997 (JP) .................................................... 9-039595

(51) Int. Cl.$^7$ ......................................................... G11B 7/00
(52) U.S. Cl. ...................... 369/112; 369/44.23; 369/44.37
(58) Field of Search ............................... 369/44.23, 44.37, 369/44.41, 112, 109, 103, 44.14, 44.12

(56) References Cited

U.S. PATENT DOCUMENTS

| 5,049,732 | * | 9/1991 | Nagahama et al. | ............... 369/44.37 |
| 5,233,444 |   | 8/1993 | Musha et al. . |  |
| 5,428,595 | * | 6/1995 | Yoshida | ................................. 369/109 |
| 5,648,946 | * | 7/1997 | Yamazaki | .......................... 369/44.23 |

FOREIGN PATENT DOCUMENTS

0631279 A2 * 12/1994 (EP) .

* cited by examiner

*Primary Examiner*—Thang V. Tran
(74) *Attorney, Agent, or Firm*—Armstrong Westerman Hattori McLeland & Naughton LLP

(57) ABSTRACT

First and second photodiodes are arranged on the upper surface of a stem, returned light beams diffracted in the + 1st order by a transmission type holographic optical element are received by the first photodiode, while returned light beams diffracted in the − 1st order are received by the second photodiode. The first photodiode has a plurality of light receiving regions, and respectively outputs a reproducing signal, a focus error signal and a tracking error signal on the basis of the returned light beams. On the other hand, the second photodiode has a single light receiving region, and outputs a reproducing signal on the basis of the returned light beams.

6 Claims, 7 Drawing Sheets

OPTICAL PICKUP APPARATUS AND OPTICAL RECORDING MEDIUM DRIVE EMPLOYING THE SAME INCLUDING A FIRST PHOTO RECEIVING ELEMENT FOR DETECTING THE STATE OF LIGHT BEAM AND A SECOND PHOTO RECEIVING ELEMENT FOR REPRODUCING INFORMATION

BACKGROUND OF THE INVENTION

1. Field of the Invention

The present invention relates to an optical pickup apparatus and an optical recording medium drive employing the same.

2. Description of the Background Art

In recent years, an optical pickup apparatus using a holographic optical element as light beam separating means has been studied and developed. FIG. 11 is a diagram showing the construction of a conventional optical pickup apparatus. The optical pickup apparatus is an apparatus for performing focus servo using an astigmatism method and tracking servo using a three-beam method in addition to an information detecting operation, which is disclosed in Japanese Patent Laid-Open No.76035/1991, for example.

As shown in FIG. 11, the optical pickup apparatus comprises a semiconductor laser device 102 for emitting laser light vertically upward, a diffraction grating 103 for dividing the laser light into three light beams, a holographic optical element 104 for transmitting the three light beams obtained by the division and diffracting returned light beams from an optical disk 100, an objective lens 105 for focusing the three light beams transmitted by the holographic optical element 104 on a recording surface of the optical disk 100 as three spots, and an optical detector 106 for detecting the returned light beams diffracted by the holographic optical element 104.

In the above-mentioned optical pickup apparatus, the laser light emitted from the semiconductor laser device 102 is divided into zero order and ± 1st order diffracted light beams by the diffraction grating 103, after which the light beams are incident on the holographic optical element 104. The three diffracted light beams are transmitted by the holographic optical element 104, and are focused as a main spot and two sub-spots on the recording surface of the optical disk 100 by a light-focusing function of the objective lens 105.

The three laser light beams focused on the optical disk 100 are reflected as three returned light beams including an information signal having information recorded on the optical disk 100. The returned light beams are incident on the holographic optical element 104 upon passing through the objective lens 105. The holographic optical element 104 transmits the three returned light beams as + 1st order and − 1st order diffracted light beams. The + 1st order diffracted light beam is incident on a light receiving surface of the optical detector 106. The optical detector 106 outputs a reproducing signal, a focus error signal obtained by an astigmatism method, and a tracking error signal obtained by a three-beam method on the basis of the returned light beam (+ 1st order diffracted light beam) received.

In the above-mentioned conventional optical pickup apparatus, only one of the returned light beams transmitted as the + 1st order diffracted light beam and the − 1st order diffracted light beam by the holographic optical element 104, for example, the + 1st order diffracted light beam is introduced into the optical detector 106, and the other returned light beam, for example, the − 1st order diffracted light beam is not utilized. Therefore, a detecting current from the optical detector 106 which corresponds to the power of the laser light emitted from the semiconductor laser device 102 is small. In order to increase output power of an information detecting signal from the optical disk 100, therefore, an output of the semiconductor laser device 102 must be increased, or an output signal from the optical detector 106 must be amplified.

In a method of increasing the output of the semiconductor laser device 102, however, a load on the semiconductor laser device 102 may, in some cases, be excessively large. On the other hand, in a method of amplifying the detecting signal from the optical detector 106, the frequency band of the detecting signal is narrowed as the amplification factor is increased, thereby degrading the frequency characteristics.

SUMMARY OF THE INVENTION

An object of the present invention is to provide an optical pickup apparatus capable of increasing output power of a detecting signal from an optical recording medium without degrading frequency characteristics and an optical recording medium drive employing the same.

An optical pickup apparatus according to the present invention for irradiating an optical recording medium with a light beam and detecting a returned light beam from the optical recording medium comprises a light source for emitting the light beam, a first diffraction element for transmitting the light beam emitted from the light source and introducing the light beam into the optical recording medium as well as diffracting the returned light beams from the optical recording medium in at least first and second directions, a first light receiving element for receiving a detecting light beam for detecting the state of the light beam on the optical recording medium out of the returned light beam diffracted in the first direction by the first diffraction element, and a second light receiving element for receiving a reproducing light beam for reproducing information recorded on the optical recording medium out of the returned light beam diffracted in the second direction by the first diffraction element.

The optical pickup apparatus according to the present invention comprises the first and second light receiving elements. The first light receiving element is so arranged as to receive the returned light beam diffracted in the first direction by the first diffraction element, to receive the reproducing light beam out of the returned light beam and output a reproducing signal. The second light receiving element is so arranged as to receive the returned light beam diffracted in the second direction by the first diffraction element, to receive the detecting light beam out of the returned light beam and output a detecting signal. Consequently, it is possible to reproduce the information recorded on the optical recording medium and perform various control operations using the detecting signal at the time of the reproduction, so that the controllability of a reproducing operation with respect to the optical recording medium is improved.

The optical pickup apparatus may be so constructed as to further comprise a second diffraction element for dividing the light beam emitted from the light source into a main light beam and a sub-light beam, and that the state of the light beam is a tracking state on the optical recording medium, the reproducing light beam is the main light beam, the detecting light beam is the sub-light beam for detecting the tracking state, the first light receiving element has a light receiving portion for receiving the sub-light beam, and the second light receiving element has a light receiving portion for receiving the main light beam.

In this case, it is possible to reproduce the information from the optical recording medium by an output signal based on the main light beam received by the second light receiving element, and it is possible to detect a tracking error on the optical recording medium by a detecting signal based on the sub-light beam received by the first light receiving element. Further, in the second light receiving element for receiving the main light beam, the main light beam may be incident on a region of the light receiving portion, so that high precision is not required for alignment between the main light beam and the light receiving portion. Therefore, it becomes easy to adjust the position of the second light receiving element.

The optical pickup apparatus may be so constructed as to further comprise a second diffraction element for dividing the light beam emitted from the light source into a main light beam and a sub-light beam, and that the state of the light beam is a focused state on the optical recording medium, the reproducing light beam and the detecting light beam are the main light beam in common, the first light receiving element has a light receiving portion for receiving the main light beam, and the second light receiving element has a light receiving portion for receiving the main light beam.

In this case, it is possible to reproduce the information from the optical recording medium by an output signal based on the main light beam received by the second light receiving element, and it is possible to detect the focused state on the optical recording medium by a detecting signal based on the main light beam received by the first light receiving element. Consequently, the focused state on the optical recording medium is maintained with high precision, making it possible to obtain an optical pickup apparatus high in reproduction precision. Further, in the second light receiving element for receiving the main light beam, the main light beam may be incident on a region of the light receiving portion, so that high precision is not required for alignment between the main light beam and the light receiving portion. Therefore, it becomes easy to adjust the position of the second light receiving element.

The optical pickup apparatus may be so constructed as to further comprise a second diffraction element for dividing the light beam emitted from the light source into a main light beam and a sub-light beam, and that the state of the light beam is a tracking state and a focused state on the optical recording medium, the detecting light beam is the sub-light beam for detecting the tracking state, the reproducing light beam and the detecting light beam are the main light beam, the first light receiving element has a light receiving portion for receiving the main light beam and a light receiving portion for receiving the sub-light beam, and the second light receiving element has a light receiving portion for receiving the main light beam.

In this case, it is possible to reproduce the information from the optical recording medium by an output signal based on the main light beam received by the second light receiving element, and it is possible to detect the focused state on the optical recording medium by a detecting signal based on the main light beam received by the first light receiving element and detect a tracking error on the optical recording medium by a detecting signal based on the sub-light beam. Consequently, it is possible to obtain an optical pickup apparatus capable of reproducing the information with high precision from the optical recording medium. In addition, in the second light receiving element for receiving the main light beam, the main light beam may be incident on a region of the light receiving portion, so that high precision is not required for alignment between the main light beam and the light receiving portion. Therefore, it becomes easy to adjust the position of the second light receiving element.

The first light receiving element may further receive a reproducing light beam for reproducing the information recorded on the optical recording medium out of the returned light beam diffracted in the first direction by the first diffraction element.

Consequently, it is possible to receive the reproducing light beam and output a reproducing signal in not only the second light receiving element but also the first light receiving element. Therefore, the amount of receiving of the reproducing light beam is almost doubled, as compared with that in a conventional optical pickup apparatus for receiving a reproducing light beam only by one light receiving element, thereby making it possible to increase output power of the reproducing signal from the first and second light receiving elements without increasing an output of the light source.

The optical pickup apparatus may be so constructed as to further comprise a second diffraction element for dividing the light beam emitted from the light source into a main light beam and a sub-light beam, and that the state of the light beam is a tracking state on the optical recording medium, the reproducing light beam is the main light beam, the detecting light beam is the sub-light beam for detecting the tracking state, the first light receiving element has a main light beam receiving portion for receiving the main light beam and a sub-light beam receiving portion for receiving the sub-light beam, and the second light receiving element has a main light beam receiving portion for receiving the main light beam.

Therefore, it is possible to reproduce the information from the optical recording medium by an output signal based on the main light beam received by the first and second light receiving elements, and it is possible to detect a tracking error on the optical recording medium by a detecting signal based on the sub-light beam received by the first light receiving element. Consequently, it is possible to obtain an optical pickup apparatus in which output power of a reproducing signal is increased, and tracking precision is high. Further, in the second light receiving element for receiving the main light beam, the main light beam may be incident on a region of the light receiving portion, so that high precision is not required for alignment between the main light beam and the light receiving portion. Therefore, it becomes easy to adjust the position of the second light receiving element.

The optical pickup apparatus may be so constructed that the sub-light beam comprises two sub-light beams positioned on both sides of the main light beam, the sub-light beam receiving portion of the first light receiving element comprises two light receiving regions arranged on both sides of the main light beam receiving portion and receiving the two sub-light beams, and the main light beam receiving portion of the second light receiving element comprises a single light receiving region.

In this case, it is possible to detect the tracking state on the optical recording medium on the basis of the difference between the amounts of the sub-light beams respectively incident on the two light receiving regions. Consequently, it is possible to easily perform a tracking operation.

The optical pickup apparatus may be so constructed as to further comprise a second diffraction element for dividing the light beam emitted from the light source into a main light beam and a sub-light beam, and that the state of the light beam is a focused state on the optical recording medium, the reproducing light beam and the detecting light beam are the main light beam in common, the first light receiving element has a main light beam receiving portion for receiving the main light beam, and the second light receiving element has a main light beam receiving portion for receiving the main light beam.

Therefore, it is possible to reproduce the information from the optical recording medium by an output signal based on the main light beam received by the first and second light receiving elements, and it is possible to detect the focused state on the optical recording medium by a detecting signal based on the main light beam received by the first light receiving element. Consequently, it is possible to obtain an optical pickup apparatus in which output power of a reproducing signal is increased, and reproduction precision is high. Further, in the second light receiving element for receiving the main light beam, the main light beam may be incident on a region of the main light beam receiving portion, so that high precision is not required for alignment between the main light beam and the main light beam receiving portion. Therefore, it becomes easy to adjust the position of the second light receiving element.

It is preferable that the first diffraction element has four regions divided by a first dividing line extending substantially along the radius of the optical recording medium and a second dividing line perpendicular to the first dividing line, the main light beam receiving portion of the first light receiving element has a first light receiving portion for receiving parts of the returned light beam being diffracted in the two of the four regions of the first diffraction element being located on first diagonal positions and a second light receiving portion for receiving parts of the returned light beam being diffracted in remaining two of the four regions of the first diffraction element being located on second diagonal positions, each of the first and second light receiving portions having a length not shorter than the distance of movement of a focusing spot of the diffracted returned light beam resulting from wavelength fluctuation of the light source in the direction in which the focusing spot moves, and the main light beam receiving portion of the second light receiving element comprises a single light receiving region.

In this case, parts of the returned light beam diffracted in two of the four regions of the first diffraction element located on the first diagonal positions are received by the first light receiving portion, and parts of the returned light beam diffracted in remaining two regions of the first diffraction element located on the second diagonal positions are received by the second light receiving portion. Consequently, it is possible to obtain a focus error signal by comparing the area for receiving parts of the returned light beam in the first light receiving portion and the area for receiving parts of the returned light beam in the second light receiving portion.

Furthermore, the first diffraction element has the four regions divided by the first dividing line extending substantially along the radius direction of the optical recording medium and the second dividing line perpendicular to the first dividing line. Even when the positions where the returned light beam are incident on the first diffraction element are changed, therefore, the area for incidence of the returned light beam on the two of the four regions of the first diffraction element located on the first diagonal positions and the area for incidence of the returned light beam on remaining two of the four regions of the first diffraction element located on the second diagonal positions are hardly changed. Even when the positions where parts of the returned light beam are incident on the first diffraction element are changed, therefore, it is possible to prevent the focus error signal from being degraded.

Moreover, each of the first and second light receiving portions for detecting the focused state has a length which is not shorter than the distance the focusing spot of the diffracted returned light beams moves by the wavelength fluctuation of the light source in the direction in which the focusing spot moves (i.e., such a length that the focusing spot is positioned in the light receiving portion even if it moves). Even if the wavelength fluctuation of the light source occurs, therefore, the amount of the returned light beam detected by each of the light receiving portions of the first light receiving element is not changed. Therefore, it is possible to prevent the focus error signal from being degraded by the wavelength fluctuation of the light source.

The two regions on the first diagonal positions of the first diffraction element and the remaining two regions on the second diagonal positions may supply the parts of the returned beam with spatial variation corresponding to the focused state for enabling detection of the focused state by comparing said parts of the returned beam being diffracted in the two regions on the first diagonal positions and the parts of the returned beam being diffracted in the remaining two regions on the second diagonal positions with each other.

In this case, the spatial variation corresponding to the focused state is given to the returned light beam diffracted by the two of the four regions of the first diffraction element located on the first diagonal positions, and is detected by the first light receiving portion of the first light receiving element, and the spatial variation corresponding to the focused state is given to the returned light beam diffracted by the remaining two of the four regions located on the second diagonal positions, and is detected by the second light receiving portion of the first light receiving element.

Even when the positions where the returned light beams are incident on the first diffraction element are changed, therefore, the total area of the returned light beam incident on the two regions located on one of the diagonal lines of the first diffraction element and the total area of the returned light beam incident on the two regions located on the other diagonal line thereof are not changed, so that the sum of the amounts of light receiving in the first light receiving portion and the sum of the amounts of light receiving in the second light receiving portion is not also changed. Consequently, it is possible to accurately detect the focused state on the optical recording medium.

Each of the first and second light receiving portions may comprise a plurality of light receiving regions being divided by a virtual dividing line substantially along the direction of movement of the focusing spot of the diffracted returned beam resulting from wavelength fluctuation of the light source.

Particularly, the plurality of light receiving regions may comprise a first light receiving region and second light receiving regions, wider than the first light receiving region, being arranged on both sides of the first light receiving region.

In this case, an optical system can be set relatively easily so that opposite points of the two focusing spots based on the returned light beam diffracted by the two regions located on the diagonal line of the first diffraction element are positioned in the narrow light receiving region. In each of the first and second light receiving portions, it is possible to add output signals obtained from the wide light receiving regions on both sides thereof, and compare the area for receiving the returned light beam diffracted by the two regions located on one of the diagonal lines and the area for receiving the returned light beam diffracted by the two regions located on the other diagonal line on the basis of the difference between the results of the addition.

Moreover, an output signal obtained from each of the narrow light receiving regions can be utilized in obtaining a reproducing signal. That is, the intensity of the reproducing signal is increased by finding the sum of the output signal from the narrow light receiving region in each of the first and second light receiving portions and the output signals from the light receiving regions on both sides thereof. As a result, it is possible to obtain a good reproducing signal.

The main light beam receiving portion of the first light receiving element may comprise a plurality of light receiving regions, and the main light beam receiving portion of the second light receiving element may comprise a single light receiving region. Particularly, the plurality of light receiving regions may be four light receiving regions divided by the dividing lines which are perpendicular to each other.

The optical pickup apparatus may be so constructed as to comprise a second diffraction element for dividing the light beam emitted from the light source into a main light beam and a sub-light beam, and that the state of the light beam is a tracking state and a focused state on the optical recording medium, the detecting light beam is the sub-light beam for detecting the tracking state, the reproducing light beam and the detecting light beam are the main light beam in common, the first light receiving element has a main light beam receiving portion for receiving the main light beam and a sub-light beam receiving portion for receiving the sublight beam, and the second light receiving element has a main light beam receiving portion for receiving the main light beam.

In this case, it is possible to reproduce the information from the optical recording medium by an output signal based on the main light beam received by the first and second light receiving elements, thereby making it possible to increase output power of a reproducing signal, as compared with that in a conventional optical pickup apparatus using one light receiving element.

Furthermore, it is possible to detect the focused state on the optical recording medium by a detecting signal based on the main light beam received by the main light beam receiving portion of the first light receiving element, and it is possible to detect the tracking state on the optical recording medium by a detecting signal based on the sub-light beam received by the sub-light beam receiving portion. Consequently, it is possible to obtain an optical pickup apparatus capable of carrying out accurate tracking control and being high in reproduction precision.

The optical pickup apparatus may be so constructed that the sub-light beam comprises two sub-light beams positioned on both sides of the main light beam, the first diffraction element has four regions divided by a first dividing line extending substantially along the radius of the optical recording medium and a second dividing line perpendicular to the first dividing line, the main light beam receiving portion of the first light receiving element has a first light receiving portion for receiving parts of the returned light beam being diffracted in two of the four regions of the first diffraction element being located on first diagonal positions and a second light receiving portion for receiving parts of returned light beam being diffracted in remaining two of the four regions of the first diffraction element being located on second diagonal positions, each of the first and second light receiving portions having a length not shorter than the distance of movement of a focusing spot of the diffracted returned light beam resulting from wavelength fluctuation of the light source in the direction in which the focusing spot moves, the sub-light beam receiving portion of the first light receiving element comprises two light receiving regions positioned on both sides of the main light beam receiving portion and receiving the two sub-light beams, and the main light beam receiving portion of the second light receiving element comprises a single light receiving region.

In this case, it is possible to prevent a focus error signal from being degraded with the change in the positions where the returned light beam is incident on the first diffraction element.

The optical pickup apparatus may be so constructed that the sub-light beam comprises two sub-light beams positioned on both sides of the main light beam, the main light beam receiving portion of the first light receiving element comprises a plurality of light receiving regions, the sub-light beam receiving portion of the first light receiving element comprises two light receiving regions positioned on both sides of the main light beam receiving portion and receiving the two sub-light beams, and the light receiving portion of the second light receiving element comprises a single light receiving region.

Furthermore, the optical pickup apparatus may further comprise an objective lens for irradiating the optical recording medium with the light beam emitted from the light source.

It is preferable that the optical pickup apparatus further comprises a base having a main surface, and the first and second light receiving elements are arranged in positions which are symmetrical to each other with respect to the light beam emitted from the light source on the main surface of the base.

In this case, it becomes easy to make position adjustment in arranging the first and second light receiving elements in correspondence with the direction of travel of the returned light beams diffracted by the first diffraction element.

It is preferable that the light source emits the light beam in a direction substantially perpendicular to the main surface of the base.

An optical recording medium drive for driving an optical recording medium according to another aspect of the present invention comprises a rotation driving mechanism for rotating the optical recording medium, an optical pickup apparatus for irradiating the optical recording medium with a light beam, a pickup driving mechanism for moving the optical pickup apparatus in the radial direction of the optical recording medium, and a signal processing circuit for processing an output signal outputted from the optical pickup apparatus, the optical pickup apparatus comprising a light source for emitting a light beam, a first diffraction element for transmitting the light beam emitted from the light source and introducing the light beam into the optical recording medium as well as diffracting returned light beam from the optical recording medium in at least first and second directions, a first light receiving element for receiving a detecting light beam for detecting the state of the light beam on the optical recording medium out of the returned light beam diffracted in the first direction by the first diffraction element, and a second light receiving element for receiving a reproducing light beam for reproducing information recorded on the optical recording medium out of the returned light beams diffracted in the second direction by the first diffraction element.

Furthermore, the first light receiving element of the optical pickup apparatus may further receive a reproducing light beam for reproducing the information recorded on the optical recording medium out of the returned light beam diffracted in the first direction by the first diffraction element.

In the optical recording medium drive, output power of a reproducing signal is increased, and focusing control and tracking control are carried out with high precision.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
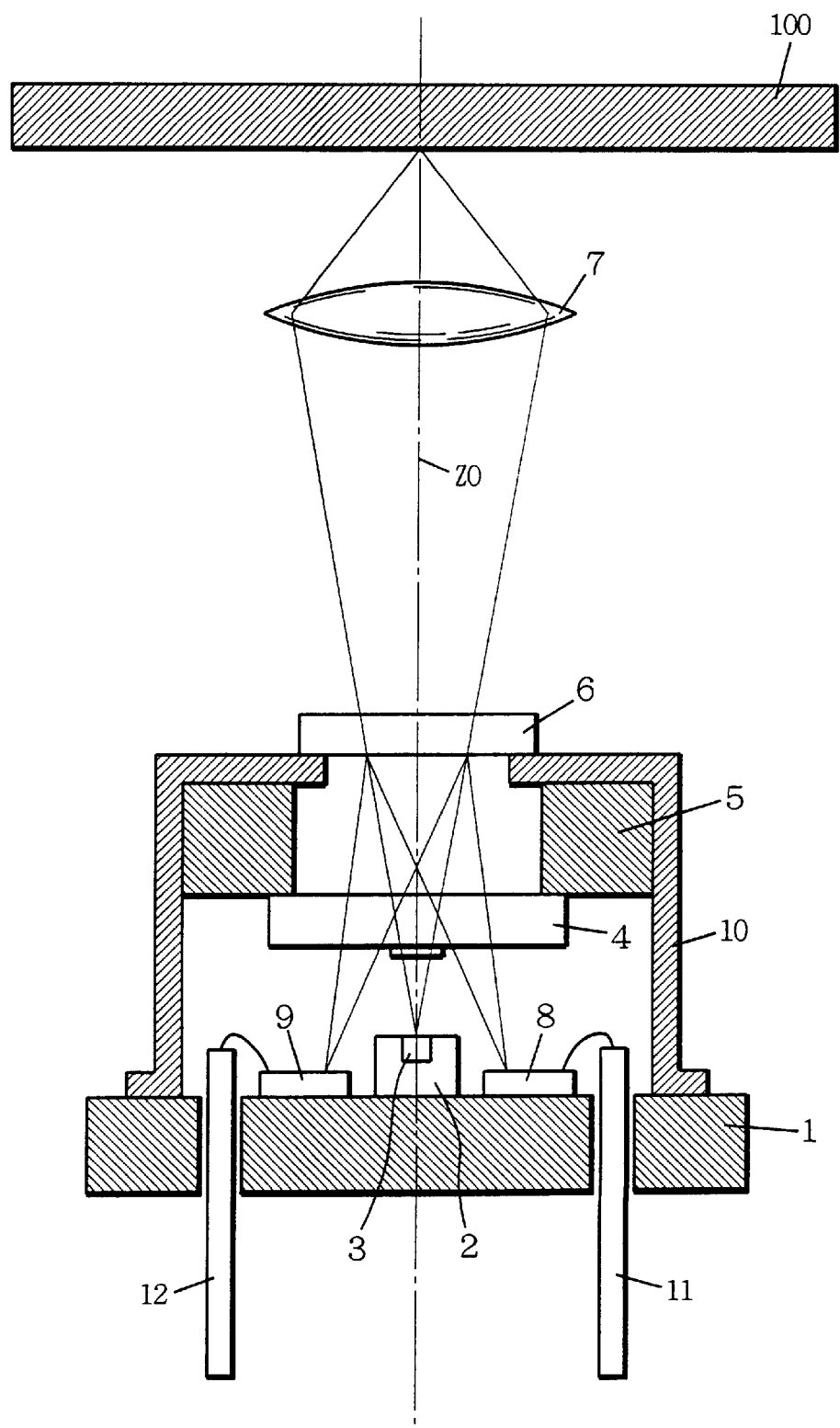
FIG. 1 is a front sectional view of an optical pickup apparatus according to an embodiment of the present invention.

FIG. 1 is a front sectional view of an optical pickup apparatus according to one embodiment of the present invention. The optical pickup apparatus comprises a semiconductor laser device 3, a diffraction grating 4, a transmission type holographic optical element 6, an objective lens 7, a first photodiode 8, and a second photodiode 9. Portions excluding the objective lens 7 are formed into a unit by a stem 1 and a holder 10.

The semiconductor laser device 3 is mounted on a side surface of a heat sink 2 arranged on the upper surface of the stem 1 so as to emit laser light vertically upward.

The diffraction grating 4 has a diffraction grating surface composed of concavities and convexities at an equal pitch on its surface on the side of the semiconductor laser device 3, and is fixed to an inner surface of the holder 10 through a spacer 5 having a predetermined thickness. The spacing between the diffraction grating 4 and the semiconductor laser device 3 is adjusted by the thickness of the spacer 5. The diffraction grating surface of the diffraction grating 4 divides the laser light emitted from the semiconductor laser device 3 into a zero order diffracted light beam (a main light beam) and ± 1st order diffracted light beams (sub-light beams) and transmit the light beams.

The transmission type holographic optical element 6 is arranged above the diffraction grating 4. The transmission type holographic optical element 6 is fixed to an opening on the upper surface of the holder 10. A holographic functional surface is formed on a surface of the transmission type holographic optical element 6 on the side of the diffraction grating 4. The holographic functional surface of the transmission type holographic optical element 6 transmits the three laser light beams emitted from the diffraction grating 4, and divides each of three returned light beams from an optical disk 100 into four parts and diffracts each of the three returned light beams in the + 1st order and in the − 1st order so as to give an astigmatism corresponding to a focused state on a recording surface of the optical disk 100 to the returned light beam.

Figure 2:
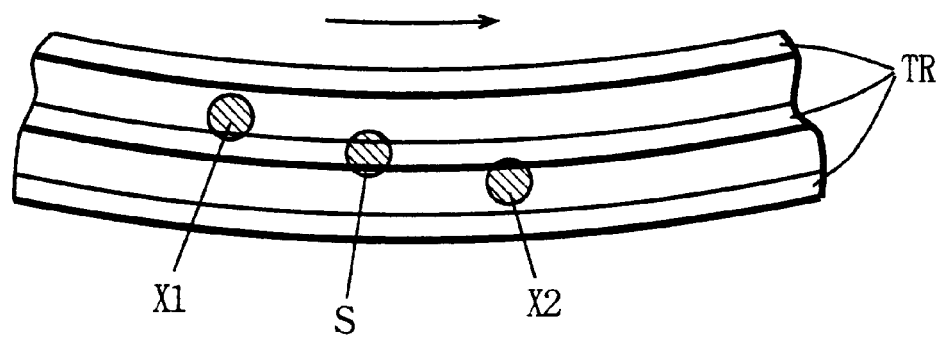
FIG. 2 is a schematic view showing a focused state on a recording surface of an optical disk.

The objective lens 7 converges the three light beams transmitted by the transmission type holographic optical element 6 as a main spot and two sub-spots on the recording surface of the optical disk 100. FIG. 2 is a schematic view showing the focused state on the recording surface of the optical disk 100. The three laser light beams obtained by the diffraction grating 4 are separated in correspondence with the direction in which a tracking surface TR of the optical disk 100 extends. When the light beams are focused on the recording surface of the optical disk 100 by the objective lens 7, therefore, three spots are formed along the tracking surface TR. The main spot S is focused on the tracking surface TR, and the two sub-spots X1 and X2 are so focused as to bestride the tracking surface TR. On the recording surface of the optical disk 100, the reflectance of laser light beams from the tracking surface TR and a surface other than the tracking surface are so set as to differ from each other. When the sub-spots X1 and X2 are shifted from the tracking surface TR, therefore, there occurs a difference in intensity between light beams reflected from the sub-spots X1 and X2. Tracking control is carried out by detecting the difference in intensity.

The three laser light beams focused on the recording surface of the optical disk 100 are reflected from the recording surface, and are incident on the transmission type holographic optical element 6 again upon passing through the objective lens 7 as three returned light beams, that is, M (a main light beam), S1 (a sub-light beam) and S2 (a sub-light beam), respectively.

Furthermore, the objective lens 7 is supported so as to be movable along the radius of the optical disk 100 in order to perform tracking servo, and is supported so as to be movable upward and downward (a direction perpendicular to the main surface of the optical disk 100) in order to perform focus servo.

Figure 3:
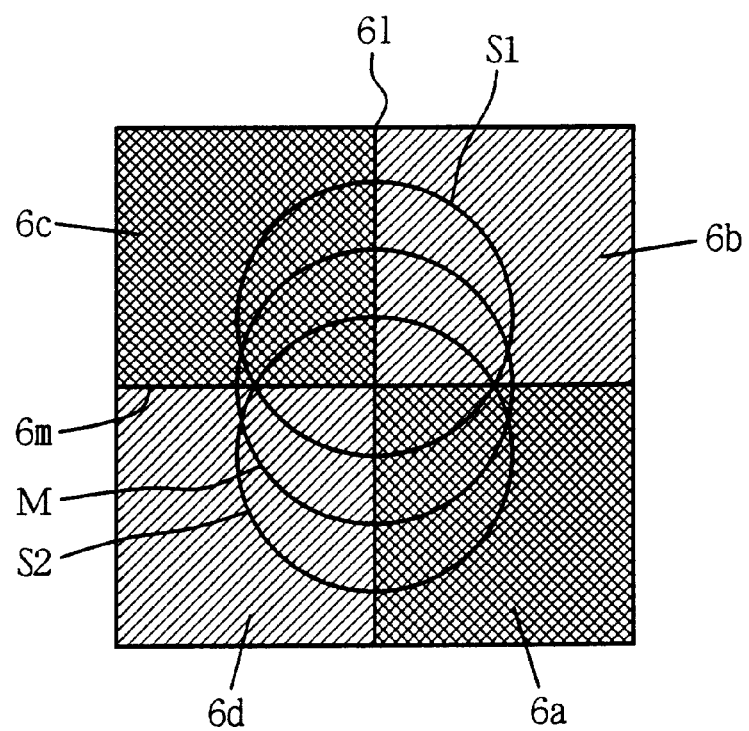
FIG. 3 is a schematic plan view showing the shape of a holographic functional surface of a transmission type holographic optical element in the optical pickup apparatus shown in FIG. 1.

FIG. 3 is a schematic view showing the shape of the holographic functional surface of the transmission type holographic optical element. In FIG. 3, the holographic functional surface is divided into four regions 6a, 6b, 6c and 6d having an equal area by a virtual dividing line 61 which almost coincides with the direction in which the tracking surface TR of the optical disk 100 extends and a virtual dividing line 6m perpendicular thereto. Each of the returned light beams M, S1 and S2 incident on the regions is so diffracted that a space variation, for example, an astigmatism is given thereto. The regions 6a and 6c and the regions 6b and 6d on the holographic functional surface respectively give astigmatisms inversely related to each other to each of the returned light beams M, S1 and S2.

Figure 4:
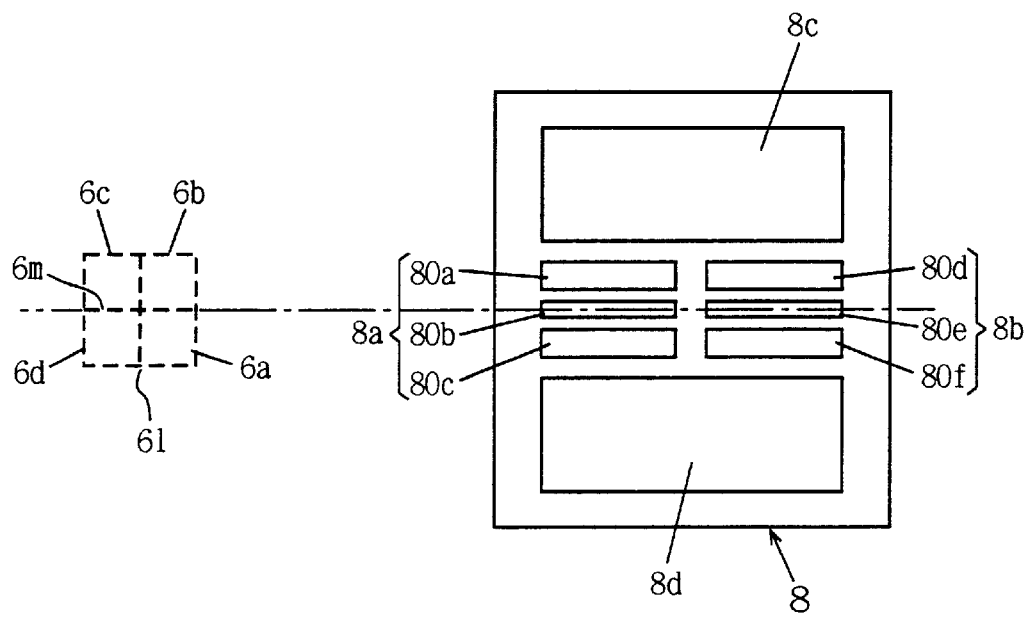
FIG. 4 is a plan view of a light receiving surface of a first photodiode in the optical pickup apparatus shown in FIG. 1.

The first photodiode 8 receives the three returned light beams M, S1 and S2 diffracted in the + 1st order and transmitted by the transmission type holographic optical element 6, and outputs a reproducing signal, a focus error signal and a tracking error signal of the optical disk 100. FIG. 4 is a schematic plan view showing a light receiving surface of the first photodiode 8. The light receiving surface of the first photodiode 8 has a pair of light detecting portions 8a and 8b for focus servo arranged in a direction along the virtual dividing line 6m of the transmission type holographic optical element 6 and a pair of light detecting portions 8c and 8d for tracking servo arranged on both sides of the optical detecting portions 8a and 8b for focus servo.

The light detecting portion 8a for focus servo comprises a narrow light receiving region 80b and wide light receiving regions 80a and 80c arranged on both sides thereof. Similarly, the light detecting portion 8b comprises a narrow light receiving region 80e and wide light receiving regions 80d and 80f arranged on both sides thereof.

On the light receiving surface of the first photodiode 8, an optical system is so adjusted that the returned light beam M diffracted in the + 1st order by the regions 6a and 6c on the holographic functional surface of the transmission type holographic optical element 6 is incident on the light detecting portion 8a, and the returned light beam M incident on the regions 6b and 6d on the holographic functional surface is incident on the light detecting portion 8b.

Even when the positions where the returned light beams are incident on the transmission type holographic optical element 6 move along the virtual dividing line 6m at the time of a tracking operation of the objective lens 7, the amounts of the light beams respectively incident on the light detecting portions 8a and 8b of the first photodiode 8 become equal to each other by the structures of the transmission type holographic optical element 6 and the first photodiode 8. As a result, a focus error signal as described later is prevented from being degraded by the tracking operation of the objective lens 7.

Furthermore, the optical system is so adjusted that the returned light beam S1 diffracted in the + 1st order by the regions 6a and 6c and the regions 6b and 6d on the holographic functional surface is incident on the light detecting portion 8c upon being split, and the returned light beam S2 diffracted in the + 1st order by the regions 6a and 6c and the regions 6b and 6d is incident on the light detecting portion 8d.

The light detecting portions 8a and 8b for focus servo and the light detecting portions 8c and 8d for tracking servo are so set as to be longer than the distance each of the focusing spots of the returned light beams diffracted by the transmission type holographic optical element 6 moves by a variation in the oscillating wavelength of the semiconductor laser device 3 in the direction in which the focusing spot moves.

The first photodiode 8 respectively outputs output signals Sa to Sc from the light receiving regions 80a to 80c of the light detecting portion 8a, and outputs output signals Sd to Sf from the light receiving regions 80d to 80f of the light detecting portion 8b. In a signal processing portion (not shown), a focus error signal FES=(Sa+Sc+Se)−(Sb+Sd+Sf) is calculated using the output signals Sa to Sf from the light detecting portions 8a and 8b.

A reproducing signal RF1 is found as the sum of the output signals Sa to Sf from the light detecting portions 8a and 8b. That is, the light detecting portions 8a and 8b receive the returned light beam M diffracted in the + 1st order with respect to the main spot S focused on the tracking surface TR of the optical disk 100, and outputs the focus error signal FES and the reproducing signal RF1.

Furthermore, the first photodiode 8 outputs an output signal SA from the light detecting portion 8c, and outputs an output signal SB from the light detecting portion 8d. A tracking error signal TES is found from the difference between the output signals SA and SB from the light detecting portions 8c and 8d, that is, TES =(SA−SB).

Figure 5:
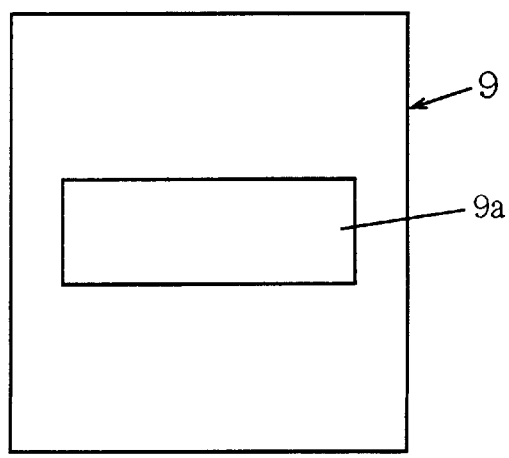
FIG. 5 is a plan view of a light receiving surface of a second photodiode.

The second photodiode 9 receives only the returned light beam M out of the three returned light beams M, S1 and S2 diffracted in the − 1st order and transmitted by the transmission type holographic optical element 6, and outputs a reproducing signal of the optical disk 100. FIG. 5 is a schematic plan view showing a light receiving surface of the second photodiode 9. The second photodiode 9 has a single light detecting portion 9a. The light detecting portion 9a is so formed that only the returned light beam M diffracted and transmitted by the holographic functional surface of the transmission type holographic optical element 6 can be incident thereon, so that the returned light beams S1 and S2 are not detected. A detecting signal outputted from the light detecting portion 9a is used upon being added to the reproducing signal RF1 from the first photodiode 8 as a reproducing signal RF2 of the optical disk 100.

The first and second photodiodes 8 and 9 are arranged in positions which are symmetrical to each other with respect to an optical axis Z0 (see FIG. 1) on the upper surface of the stem 1.

A plurality of lead terminals 11 and 12 pass through the stem 1. Their respective one ends project outward, and the other ends thereof are electrically connected to terminals of the first photodiode 8 and the second photodiode 9 through bonding wires, respectively. Further, a lead terminal (not shown) electrically connected to the semiconductor laser device 3 is similarly constructed.

In the present embodiment, the semiconductor laser device 3 corresponds to a light source, the transmission type holographic optical element 6 corresponds to a first diffraction element, the diffraction grating 4 corresponds to a second diffraction element, the first photodiode 8 corresponds to a first light receiving element, and the second photodiode 9 corresponds to a second light receiving element.

Description is now made of operations performed by the optical pickup apparatus of the above-mentioned construction. The laser light emitted vertically upward from the semiconductor laser device 3 is transmitted upon being divided into three diffracted light beams, that is, zero order, + 1st order and − 1st order diffracted light beams by the diffraction grating 4. Further, the three diffracted light beams are transmitted by the transmission type holographic optical element 6, and are incident on the objective lens 7. The objective lens 7 converges the three diffracted light beams on the recording surface of the optical disk 100 as the main spot S and the two sub-spots X1 and X2 shown in FIG. 2. The three returned light beams M, S1 and S2, which correspond to the main spot S and the two sub-spots X1 and X2, reflected from the recording surface of the optical disk 100 travel vertically downward upon passing through the objective lens 7 again, and are incident on the transmission type holographic optical element 6.

The transmission type holographic optical element 6 diffracts the three returned light beams M, S1 and S2, to introduce the returned light beams M, S1 and S2 diffracted in the + 1st order into the first photodiode 8 and introduce the returned light beams M, S1 and S2 diffracted in the − 1st order into the second photodiode 9.

Figure 6:
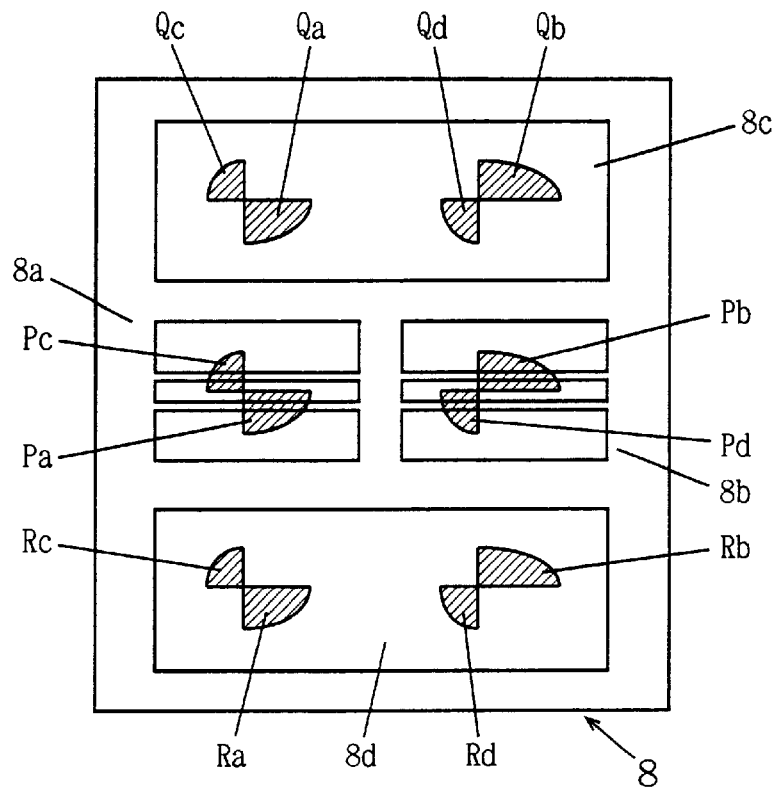
FIG. 6 is a schematic plan view showing a light received state of the first photodiode.

FIG. 6 is a schematic plan view showing a light received state of the first photodiode. In FIG. 6, in the case of the returned light beam M diffracted by the transmission type holographic optical element 6 in FIG. 3, the light beam passing through the regions 6a and 6c on the holographic functional surface is incident on the light detecting portion 8a as split light beams Pa and Pc, and the light beam passing through the regions 6b and 6d is incident on the light detecting portion 8b as split light beams Pb and Pd. On the other hand, in the case of the returned light beam S1 corresponding to the sub-spot X1, the light beam passing through the regions 6a and 6c is incident on the light detecting portion 8c as split light beams Qa and Qc, and the light beam passing through the regions 6b and 6d is incident on the light detecting portion 8c as split light beams Qb and Qd. Further, in the case of the returned light beam S2 corresponding to the sub-spot X2, the light beam passing through the regions 6a and 6c is incident on the light detecting portion 8d as split light beams Ra and Rc, and the light beam passing through the regions 6b and 6d is incident on the light detecting portion 8d as split light beams Rb and Rd.

In the first photodiode 8, the returned light beam M incident on the light detecting potion 8a and the light detecting portion 8b upon being split is converted into an electric signal, to output the signals Sa to Sf for detecting a reproducing signal and for focus servo. Further, the returned light beam S1 incident on the light detecting portion 8c and the returned light beam S2 incident on the light detecting portion 8d are respectively converted into electric signals, to output the signals SA and SB for tracking servo.

Figure 7:
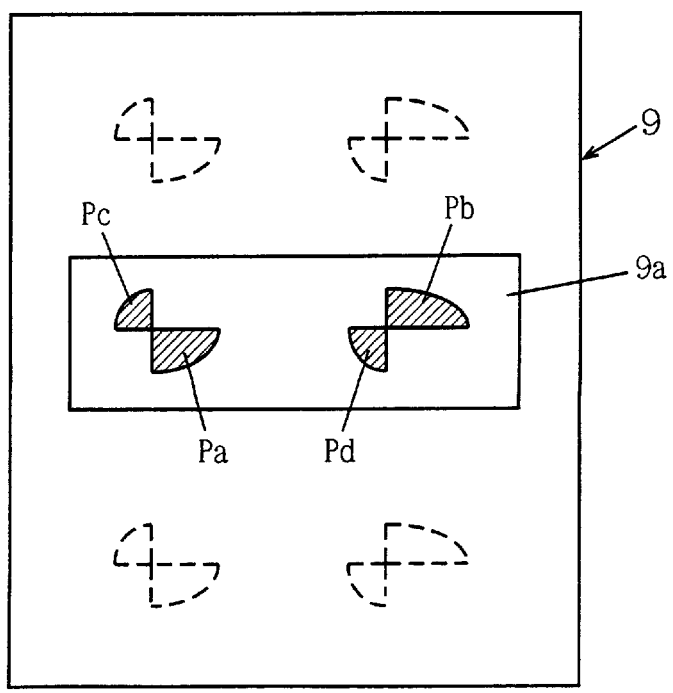
FIG. 7 is a schematic plan view showing a light received state of the second photodiode.

FIG. 7 is a schematic plan view showing a light received state of the second photodiode. As shown in FIG. 7, the second photodiode 9 detects only the returned light beam M (Pa to Pd) diffracted in the − 1st order by the transmission type holographic optical element 6 and introduced into the light detecting portion 9a, and converts the returned light beam M into an electric signal, to output an output signal SS for detecting a reproducing signal.

Consequently, it is possible to perform a tracking servo operation based on the output signals SA and SB from the first photodiode 8, an information reproducing operation based on the output signals Sa to Sf and SS from the first and second photodiodes 8 and 9, and a focus servo operation based on the output signals Sa to Sf from the first photodiode 8.

In the optical pickup apparatus according to the present embodiment, the returned light beams diffracted in the + 1st order and in the − 1st order by the transmission type holographic optical element 6 are respectively received by the first photodiode 8 and the second photodiode 9, to output detecting signals based on the amounts of the received light beams. Therefore, detecting currents for reproducing output from the first and second photodiodes 8 and 9 are almost doubled, as compared with those in a conventional optical pickup apparatus in which only one of returned light beams diffracted in two directions by a holographic optical element is received by a light receiving element.

On the other hand, in the second photodiode 9, the returned light beam M corresponding to the main spot S on the optical disk 100 may be incident on the light detecting portion 9a. Therefore, the necessity of accurately adjusting the position where the returned light beam M is incident is eliminated, making it easy to adjust the position of the second photodiode 9.

Furthermore, the first and second photodiodes 8 and 9 are independently arranged on the stem 1, respectively. Therefore, the positions of the first and second photodiodes 8 and 9 can be separately adjusted, so that the first photodiode 8 requiring accurate position adjustment and the second photodiode 9 requiring no relatively high-precision position adjustment can be adjusted so as to meet the respective requirements.

Figure 8:
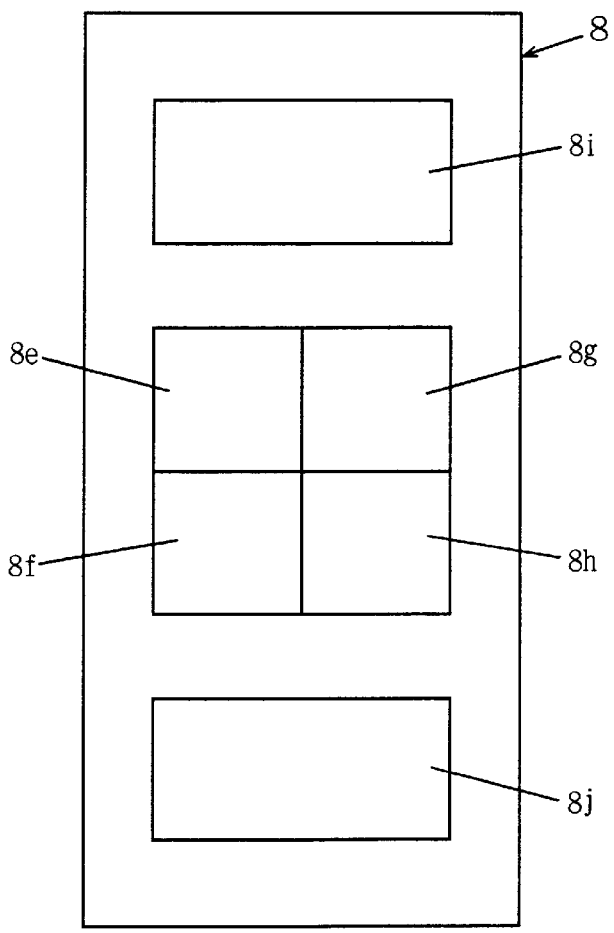
FIG. 8 is a plan view of a light receiving surface of a first photodiode according to another embodiment.
Figure 9:
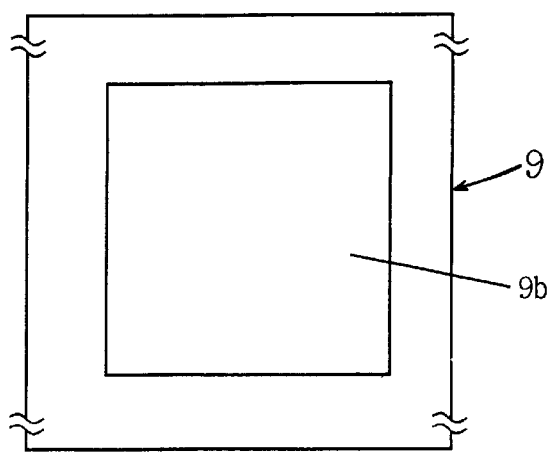
FIG. 9 is a plan view of a light receiving surface of a second photodiode according to another embodiment.

FIGS. 8 and 9 are diagrams showing another embodiment of the first and second photodiodes in the optical pickup apparatus according to the present invention, where FIG. 8 is a plan view of a first photodiode 8 corresponding to FIG. 6, and FIG. 9 is a plan view of a second photodiode 9 corresponding to FIG. 7.

The photodiode 8 shown in FIG. 8 has a structure in which a focus error signal is outputted using four detecting portions 8e to 8h. When the first photodiode 8 is used, a holographic functional surface of a transmission type holographic optical element 6 need not be divided into four parts as shown in FIG. 3, and is constituted by a single holographic functional surface.

A returned light beam M diffracted in the + 1st order which is incident on the four detecting portions 8e to 8h is converted into an electric signal in the light detecting portions 8e to 8h, which is outputted for a focus error signal and for a reproducing signal. Further, a returned light beam S1 incident on a light detecting portion 8i and a returned light beam S2 incident on a light detecting portion 8j are outputted as tracking error signals.

On the other hand, a light detecting portion 9b of the second photodiode 9 is constituted by a single region, to receive a returned light beam M diffracted in the − 1st order by the transmission type holographic optical element. A detecting signal corresponding to the amount of the received light beam is outputted as a reproducing signal.

Even in a case where the first and second photodiodes 8 and 9 having the above-mentioned structures of light receiving surfaces are used, it is possible to obtain the same effect as that in a case where the first and second photodiodes 8 and 9 having the light receiving surfaces shown in FIGS. 4 and 5 are used.

The first and second photodiodes 8 and 9 are not limited to the above-mentioned photodiodes. For example, photodiodes having light receiving surfaces in other shapes and structures may be applied, provided that one of the photodiodes can detect a focus error signal and a tracking error signal, and the other photodiode can detect a reproducing signal. Particularly, one of the first and second photodiodes 8 and 9 may only detect a focus error signal and a tracking error signal, and the other photodiode may only detect a reproducing signal.

Figure 10:
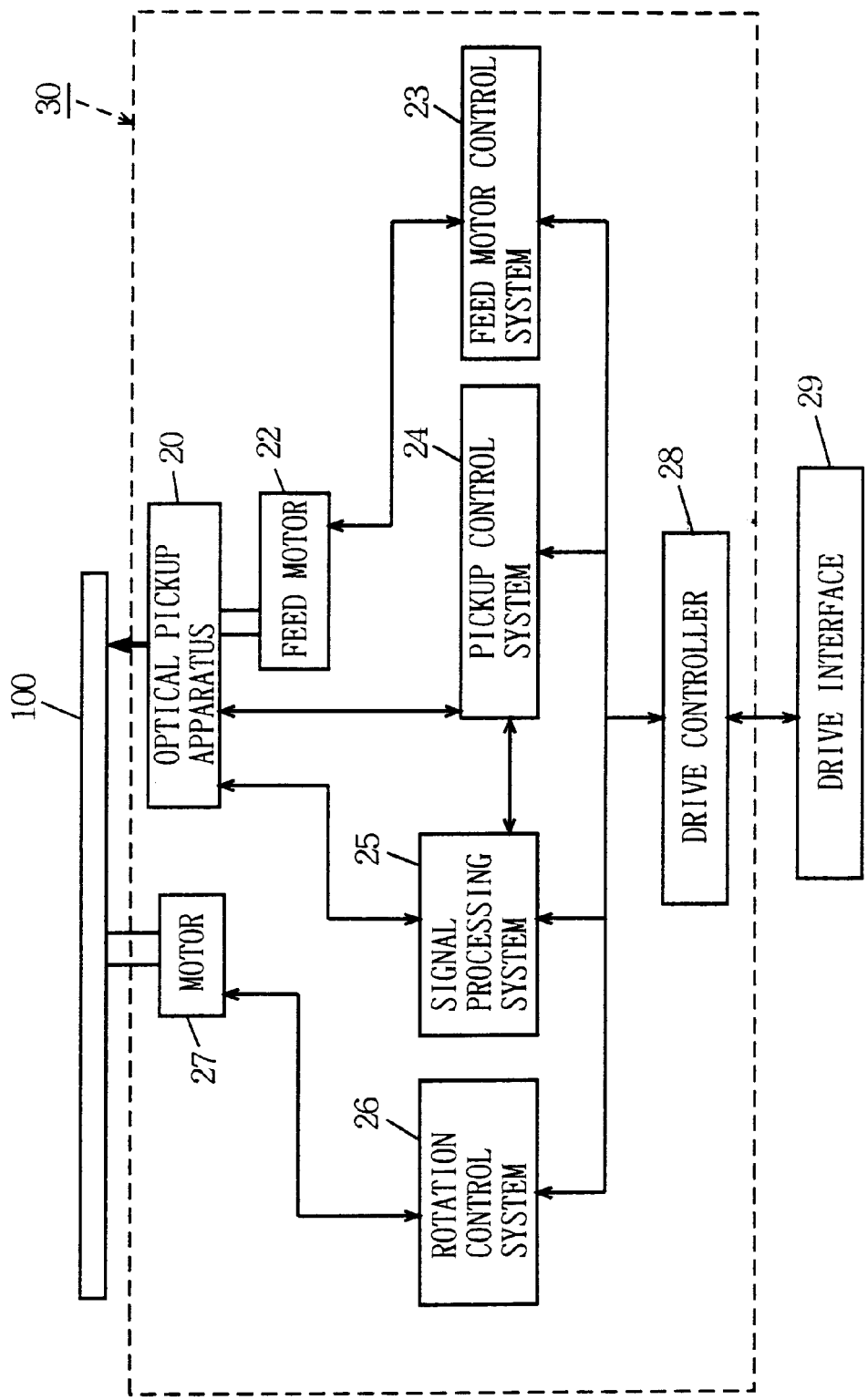
FIG. 10 is a block diagram showing the construction of an optical recording medium drive.
Figure 11:
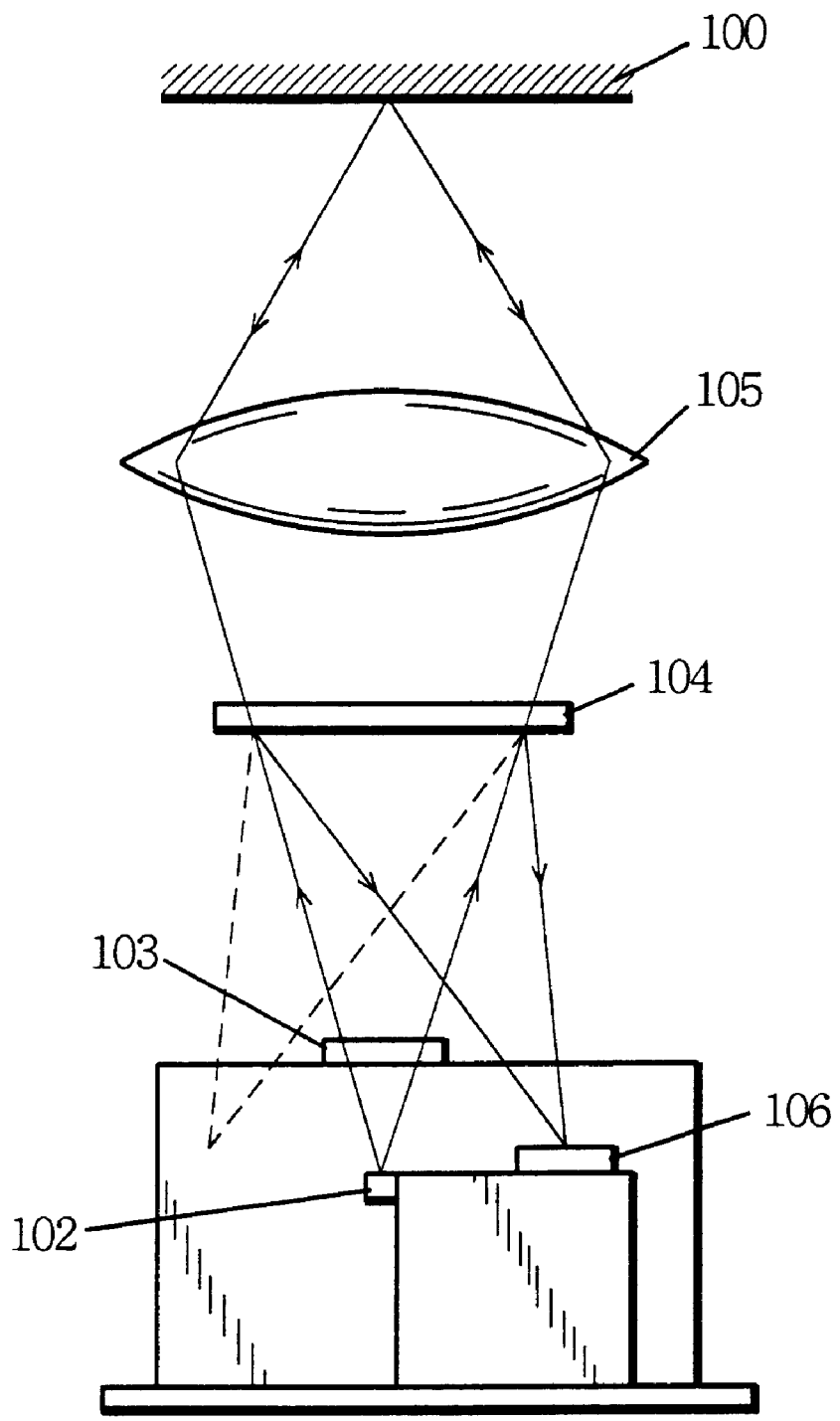
FIG. 11 is a front view showing the construction of a conventional optical pickup apparatus.

FIG. 10 is a block diagram showing the construction of an optical recording medium drive using the optical pickup apparatus according to the present embodiment. An optical recording medium drive 30 comprises a motor 27 for rotating an optical disk 100 and a rotation control system 26 for controlling a rotating operation of the motor 27. An optical pickup apparatus 20 is arranged below the optical disk 100. In the optical pickup apparatus 20, the position where information or the like is detected is moved along the radius of the optical disk 100 by a feed motor 22. The operation of the feed motor 22 is controlled by a feed motor control system 23. Further, the operation of the optical pickup apparatus 20 is controlled by a pickup control system 24, and a detecting signal from the optical pickup apparatus 20 is processed by a signal processing system 25. The operation of each processing system in the optical recording medium drive 30 is controlled by a drive controller 28.

In the present embodiment, the motor 27 and the rotation control system 26 correspond to a rotating mechanism, the feed motor 22 and the feed motor control system 23 correspond to a pickup driving mechanism, and the signal processing system 25 corresponds to a signal processing circuit.

The optical recording medium drive 30 is connected to a recording and reproducing device through a drive interface 29, to perform information reproducing processing, for example, based on a detecting signal.

A high-precision information reproducing operation in which output power of an information detecting signal is increased can be performed by using the optical pickup apparatus 20 according to the present embodiment in the above-mentioned optical recording medium drive 30.

Although in the optical pickup apparatus and the optical recording medium drive in the above-mentioned embodiment, the transmission type holographic optical element 6 is used as a diffraction element, a reflection type holographic optical element may be used.

Although in the above-mentioned embodiment, the transmission type diffraction grating 4 is used, a reflection type diffraction grating may be used.

Furthermore, an optical element obtained by integrating the diffraction grating 4 and the transmission type holographic optical element 6 may be used. Further, a method other than the above-mentioned three-beam method may be used as a tracking servo method.

Although the present invention has been described and illustrated in detail, it is clearly understood that the same is by way of limitation, the spirit and scope of the present invention being limited only by the terms of the appended claims.

What is claimed is:

1. An optical pickup apparatus for irradiating an optical recording medium with a light beam and detecting a returned light beam from said optical recording medium, comprising:
    a light source for emitting the light beam;
    a first diffraction element for transmitting the light beam emitted from said light source and introducing the light beam into said optical recording medium as well as diffracting the returned light beam from said optical recording medium in at least first and second directions;
    a first light receiving element for receiving a detecting light beam for detecting the state of the light beam on said optical recording medium out of the returned light beam diffracted in said first direction by said first diffraction element;
    a second light receiving element for receiving a reproducing light beam for reproducing information recorded on said optical recording medium out of the returned light beam diffracted in said second direction by said first diffraction element; and
    a second diffraction element for dividing the light beam emitted from said light source into a main light beam and a sub-light beam, wherein
        said first light receiving element further receives a reproducing light beam for reproducing the information recorded on said optical recording medium out of the returned light beam diffracted in said first direction by said first diffraction element,
        said state of the light beam is a focused state on said optical recording medium,
        said reproducing light beam and said detecting light beam are said main light beam in common,
        said first light receiving element has a main light beam receiving portion for receiving said main light beam, and
        said second light receiving element has a main light beam receiving portion for receiving said main light beam,
        said first diffraction element has four regions divided by a first dividing line extending substantially along the radius of said optical recording medium and a second dividing line perpendicular to said first dividing line,
        said main light beam receiving portion of said first light receiving element has a first light receiving portion for receiving parts of said returned light beam being diffracted in the two of said four regions of said first diffraction element being located on first diagonal positions and a second light receiving portion for receiving parts of said returned light beam being diffracted in remaining two of said four regions of said first diffraction element being located on second diagonal positions, each of said first and second light receiving portions having a length not shorter than the distance of movement of a focusing spot of said diffracted returned light beam resulting from wavelength fluctuation of said light source in the direction in which said focusing spot moves, and
        said main light beam receiving portion of said second light receiving element comprises a single light receiving region.

2. The optical pickup apparatus according to claim 1, wherein
    said two regions on said first diagonal positions of said first diffraction element and said remaining two regions on said second diagonal positions supply said parts of said returned beam with spatial variation corresponding to the focused state for enabling detection of said focused state by comparing said parts of said returned beam being diffracted in said two regions on said first diagonal positions and said parts of said returned beam being diffracted in said remaining two regions on said second diagonal positions with each other.

3. The optical pickup apparatus according to claim 1, wherein
    each of said first and second light receiving portions comprises a plurality of light receiving regions being divided by a virtual dividing line substantially along the direction of movement of said focusing spot of said diffracted returned beam resulting from wavelength fluctuation of said light source.

4. The optical pickup apparatus according to claim 3, wherein
    said plurality of light receiving regions comprise a first light receiving region and second light receiving regions, wider than said first light receiving region, being arranged on both sides of said first light receiving region.

5. An optical pickup apparatus for irradiating an optical recording medium with a light beam and detecting a returned light beam from said optical recording medium, comprising:
    a light source for emitting the light beam;
    a first diffraction element for transmitting the light beam emitted from said light source and introducing the light beam into said optical recording medium as well as diffracting the returned light beam from said optical recording medium in at least first and second directions;
    a first light receiving element for receiving a detecting light beam for detecting the state of the light beam on said optical recording medium out of the returned light beam diffracted in said first direction by said first diffraction element;
    a second light receiving element for receiving a reproducing light beam for reproducing information recorded on said optical recording medium out of the returned light beam diffracted in said second direction by said first diffraction element; and
    a second diffraction element for dividing the light beam emitted from said light source into a main light beam and a sub-light beam, wherein said first light receiving element further receives a reproducing light beam for reproducing the information recorded on said optical recording medium out of the returned light beam diffracted in said first direction by said first diffraction element, said state of the light beam is a tracking state and a focused state on said optical recording medium, said detecting light beam is the sub-light beam for detecting said tracking state, said reproducing light beam and said detecting light beam are said main light beam in common, said first light receiving element has a main light beam receiving portion for receiving said main light beam and a sub-light beam receiving portion for receiving said sub-light beam, said second light receiving element has a main light beam receiving portion for receiving said main light beam, said sub-light beam comprises two sub-light beams positioned on both sides of said main light beam, said first diffraction element has four regions divided by a first dividing line extending substantially along the radius of said optical recording medium and a second dividing line perpendicular to said first dividing line, said main light beam receiving portion of said first light receiving element has a first light receiving portion for receiving parts of said returned light beam being diffracted in two of said four regions of said first diffraction element being located on first diagonal positions and a second light receiving portion for receiving parts of said returned light beam being diffracted in remaining two of said four regions of said first diffraction element being located on second diagonal positions, each of said first and second light receiving portions having a length not shorter than the distance of movement of a focusing spot of said diffracted returned light beam resulting from wavelength fluctuation of said light source in the direction in which the focusing spot moves, said sub-light beam receiving portion of said first light receiving element comprises two light receiving regions positioned on both sides of said main light beam receiving portion and receiving said two sub-light beams, and said main light beam receiving portion of said second light receiving element comprises a single light receiving region.

6. An optical recording medium drive for driving an optical recording medium, comprising:

a rotation driving mechanism for rotating said optical recording medium;

an optical pickup apparatus for irradiating said optical recording medium with a light beam;

a pickup driving mechanism for moving said optical pickup apparatus in the radial direction of said optical recording medium; and a signal processing circuit for processing an output signal from said optical pickup apparatus, wherein said optical pickup apparatus comprising a light source for emitting a light beam, a first diffraction element for transmitting the light beam emitted from said light source and introducing the light beam into said optical recording medium as well as diffracting returned light beam from said optical recording medium in at least first and second directions, a first light receiving element for receiving a detecting light beam for detecting the state of the light beam on said optical recording medium and a reproducing light beam for reproducing the information recorded on said optical recording medium out of the returned light beam diffracted in said first direction by said first diffraction element;

a second light receiving element for receiving a reproducing light beam for reproducing information recorded on said optical recording medium out of the returned light beams diffracted in said second direction by said first diffraction element, and a second diffraction element for dividing the light beam emitted from said light source into a main light beam and a sub-light beam, wherein said state of the light beam is a focused state on said optical recording medium, said reproducing light beam and said detecting light beam are said main light beam in common, said first light receiving element has a main light beam receiving portion for receiving said main light beam, and said second light receiving element has a main light beam receiving portion for receiving said main light beam, said first diffraction element has four regions divided by a first dividing line extending substantially along the radius of said optical recording medium and a second dividing line perpendicular to said first dividing line, said main light beam receiving portion of said first light receiving element has a first light receiving portion for receiving parts of said returned light beam being diffracted in the two of said four regions of said first diffraction element being located on first diagonal positions and a second light receiving portion for receiving parts of said returned light beam being diffracted in remaining two of said four regions of said first diffraction element being located on second diagonal positions, each of said first and second light receiving portions having a length not shorter than the distance of movement of a focusing spot of said diffracted returned light beam resulting from wavelength fluctuation of said light source in the direction in which said focusing spot moves, and said main light beam receiving portion of said second light receiving element comprises a single light receiving region.

* * * * *